(12) United States Patent
Chon et al.

(10) Patent No.: US 10,239,041 B2
(45) Date of Patent: Mar. 26, 2019

(54) CARBONATION DEVICE AND METHOD OF CARBONATION USING THE SAME

(71) Applicants: POSCO, Pohang-si, Gyeongsangbuk-do (KR); RESEARCH INSTITUTE OF INDUSTRIAL SCIENCE & TECHNOLOGY, Pohang-si, Gyeongsangbuk-do (KR); MPPLY CO., LTD., Daejeon (KR)

(72) Inventors: Uong Chon, Pohang-si (KR); Im Chang Lee, Daejeon (KR); Ki Young Kim, Pohang-si (KR); Gi-Chun Han, Cheongju-si (KR); Woonkyoung Park, Ansan-si (KR); Kee Uek Jeung, Pohang-si (KR); Chang Ho Song, Incheon (KR)

(73) Assignees: POSCO, Pohang-si, Gyeongsangbuk-Do (KR); RESEARCH INSTITUTE OF INDUSTRIAL SCIENCE & TECHNOLOGY, Pohang-si, Gyeongsangbuk-Do (KR); MPPLY CO., LTD., Daejeon (KR)

( * ) Notice: Subject to any disclaimer, the term of this patent is extended or adjusted under 35 U.S.C. 154(b) by 693 days.

(21) Appl. No.: 14/370,507

(22) PCT Filed: Dec. 27, 2012

(86) PCT No.: PCT/KR2012/011604
§ 371 (c)(1),
(2) Date: Jul. 3, 2014

(87) PCT Pub. No.: WO2013/103215
PCT Pub. Date: Jul. 11, 2013

(65) Prior Publication Data
US 2015/0023127 A1  Jan. 22, 2015

(30) Foreign Application Priority Data

Jan. 6, 2012 (KR) .................. 10-2012-0002181

(51) Int. Cl.
*B01J 19/26* (2006.01)
*B01F 5/20* (2006.01)
(Continued)

(52) U.S. Cl.
CPC ........... *B01J 19/26* (2013.01); *B01F 3/04439* (2013.01); *B01F 5/20* (2013.01); *B01J 4/002* (2013.01);
(Continued)

(58) Field of Classification Search
CPC .......... C01D 15/08; C01D 7/07; C01F 11/181
See application file for complete search history.

(56) References Cited

U.S. PATENT DOCUMENTS 1,178,962 A * 4/1916 Statham Noel ....... C01F 11/181
23/293 A
3,202,477 A * 8/1965 Loeffler, Jr. ............... C01D 7/07
423/421
(Continued)

FOREIGN PATENT DOCUMENTS

CN     101726439 A   6/2010
CN       1962452 A   7/2014
(Continued)

*Primary Examiner* — Tony G Soohoo
*Assistant Examiner* — Elizabeth Insler
(74) *Attorney, Agent, or Firm* — Cantor Colburn LLP

(57) ABSTRACT

Disclosed is a carbonation device including: a storage tank storing a carbonation subject solution; a droplet spray unit spraying the carbonation subject solution from the storage tank as droplets; a carbonation reaction tank disposed with the droplet spray unit and filled with a carbonation gas under a predetermined pressure to provide a slurry by a carbonation reaction of the droplet-sprayed carbonation subject
(Continued)

solution with the filled carbonation gas; a carbonation gas supply unit supplying the carbonation gas into the carbonation reaction tank to maintain the carbonation gas in the carbonation reaction tank under the predetermined pressure; and a slurry outlet unit ejecting the slurry from the carbonation reaction tank to maintain the slurry formed in the carbonation reaction tank within a predetermined level, and a method of carbonation using the same.

12 Claims, 1 Drawing Sheet

(51) Int. Cl.
| | | |
|---|---|---|
| *B01F 3/04* | (2006.01) | |
| *B01J 19/18* | (2006.01) | |
| *B01J 4/00* | (2006.01) | |
| *C01F 5/24* | (2006.01) | |
| *C01F 11/18* | (2006.01) | |
| *C01D 15/08* | (2006.01) | |
| *C01B 32/60* | (2017.01) | |

(52) U.S. Cl.
CPC ............... *B01J 19/18* (2013.01); *C01B 32/60* (2017.08); *C01D 15/08* (2013.01); *C01F 5/24* (2013.01); *C01F 11/181* (2013.01); *B01J 2219/00162* (2013.01); *B01J 2219/00177* (2013.01); *B01J 2219/00182* (2013.01); *B01J 2219/00247* (2013.01)

(56) References Cited

U.S. PATENT DOCUMENTS

| | | | | |
|---|---|---|---|---|
| 3,975,503 A | * | 8/1976 | Hauschild | C01D 7/37 423/189 |
| 4,124,688 A | * | 11/1978 | Shibazaki | B01D 9/0036 423/432 |
| 4,133,894 A | | 1/1979 | Shibazaki et al. | |
| 4,272,498 A | | 6/1981 | Faatz | |
| 4,448,682 A | * | 5/1984 | Moritz | C01D 3/16 210/101 |
| 5,678,240 A | * | 10/1997 | Herrmann | C01D 1/04 423/189 |
| 8,263,030 B1 | * | 9/2012 | Jones | C01D 7/00 423/201 |
| 2006/0292056 A1 | | 12/2006 | Lin | |
| 2008/0069757 A1 | | 3/2008 | Maijala | |
| 2010/0260663 A1 | | 10/2010 | O'Dowd | |

FOREIGN PATENT DOCUMENTS

| | | |
|---|---|---|
| JP | 53-039998 | 4/1978 |
| JP | 58-37596 | 3/1983 |
| JP | 61-046236 | 3/1986 |
| JP | 02-257587 A | 10/1989 |
| JP | 02-266096 | 10/1990 |
| JP | 06-178742 A | 6/1994 |
| JP | 2001-144020 | 5/2001 |
| JP | 2008-506618 A | 3/2008 |
| JP | 2008-078285 A | 4/2008 |
| JP | 2009-028622 | 2/2009 |
| JP | 2010-082526 A | 4/2010 |
| JP | 2011-131114 A | 7/2011 |
| JP | 2011-193891 A | 10/2011 |
| JP | 1680192 A | 10/2015 |
| KR | 10-2007-0044835 A | 4/2007 |
| KR | 10-2008-0092738 A | 10/2008 |
| KR | 10-2009-0000368 A | 1/2009 |
| KR | 10-2009-0126129 A | 12/2009 |
| WO | WO 2008/101293 A1 | 8/2008 |

* cited by examiner

[Figure 1]
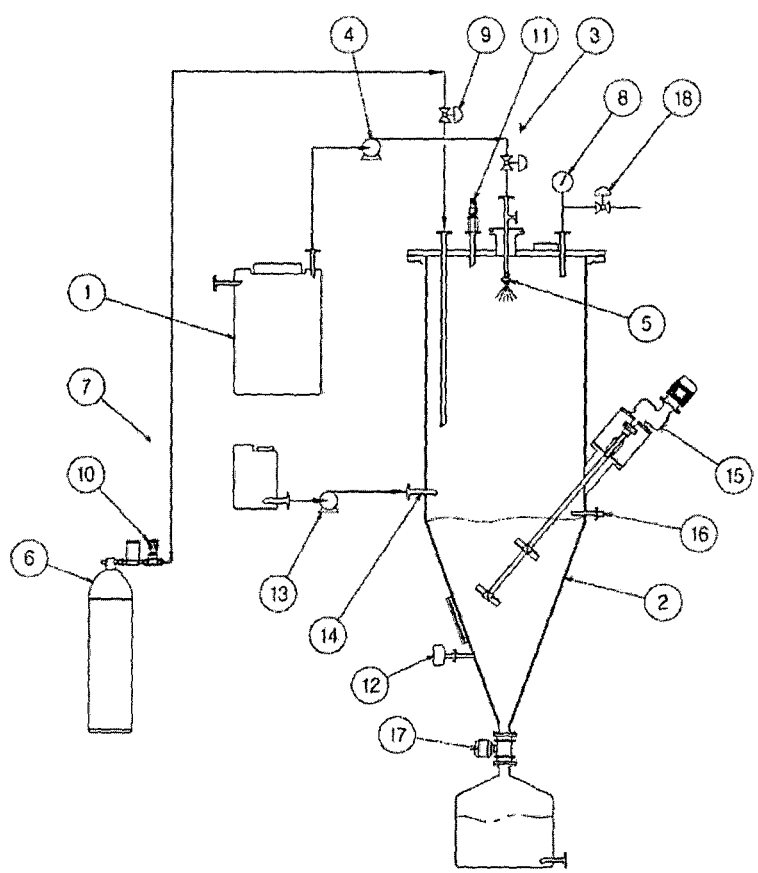

CARBONATION DEVICE AND METHOD OF CARBONATION USING THE SAME

TECHNICAL FIELD

A carbonation device and a method of carbonation using the same are disclosed.

BACKGROUND ART

Generally, a carbonation technique is used by precipitating a calcium carbonate functional powder from a limestone raw material, and the precipitated calcium carbonate is produced by calcining limestone to provide quick lime, hydrating the same to provide a calcium hydroxide slurry, aerating the slurry with carbon dioxide to provide calcium carbonate in the solution, and reprecipitating the same. The conventional carbonation is performed by injecting a carbon dioxide aerator into a carbonation subject solution, and aerating carbon dioxide as small bubbles to dissolve the aerated bubbles while passing through the solution and to be converted to carbonate ions. But the nozzle of the aerator is very often clogged by the deposited carbonate ions at the inlet thereof, the carbon dioxide is excessively consumed, a continuous process is difficult to accomplish in a high-capacity industrial process, and the reaction efficiency is deteriorated since the reaction occurs for a short time while passing the carbon dioxide bubbles through the solution.

DISCLOSURE

Technical Problem

One aspect of the present invention may prevent clogging of a carbonation gas (for example, carbon dioxide) spray nozzle during a carbonation reaction and may suppress the excessive consumption of the carbonation gas by consuming as much carbonation gas as required for a carbonation reaction.

In addition, a carbonation device may be provided so that a continuous high-capacity process is accomplished, and the dissolution speed of carbonation gas is increased to enhance carbonation efficiency.

For example, when recovering lithium (Li) included in brine, calcium, magnesium, or the like present as impurities in the brine may be carbonated and extracted.

In addition, when converting the lithium recovered as lithium hydroxide into lithium carbonate, the carbonation device according to one embodiment may be applied.

Technical Solution

One aspect of the present invention provides a carbonation device including: a storage tank storing a carbonation subject solution; a droplet spray unit droplet-spraying the carbonation subject solution from the storage tank; a carbonation reaction tank including the droplet spray unit and filled with carbonation gas having a predetermined pressure and carbonating the droplet-sprayed carbonation subject solution with the filled carbonation gas to provide a slurry; a carbonation gas supply unit supplying the carbonation gas into the carbonation reaction tank to maintain the carbonation gas under the predetermined pressure in the carbonation reaction tank; and a slurry outlet unit ejecting the slurry formed in the carbonation reaction tank from the carbonation reaction tank to maintain the slurry amount within a predetermined level.

The slurry outlet unit ejecting the slurry formed in the carbonation reaction tank from the carbonation reaction tank to maintain the slurry amount within the predetermined level may include: a level measurement unit generating a signal to confirm whether the amount of slurry is out of the predetermined level in the carbonation reaction tank; and a slurry outlet ejecting the slurry from the carbonation reaction tank by receiving the signal.

It may further include an alkali solution input unit disposed in the carbonation reaction tank and controlling pH of the slurry formed in the carbonation reaction tank.

The droplet spray unit pushes the carbonation subject solution by pressure and passes the same through a nozzle to provide a droplet.

The droplet may have a particle diameter of about 80 to about 200 μm.

The carbonation gas supply unit may include: a pressure measuring unit measuring pressure inside the carbonation reaction tank; a carbonation gas supply valve supplying the carbonation gas into the carbonation reaction tank until reaching the pressure in the carbonation reaction tank to a set pressure when the measured pressure is below the set pressure; and a pressure control valve exhausting the carbonation gas when the measured pressure is above the set pressure.

A safety valve may be further included for safety, to rapidly decrease the internal pressure when the pressure in the carbonation reaction tank is excessively increased.

The pressure in the carbonation reaction tank may range from room pressure to about 10 bar.

The droplet in the carbonation reaction tank free-falls, and the free-fall distance may be designed to be greater than or equal to about 3 meters.

The carbonation reaction tank may be made of PVC, PE, or high-strength concrete.

The carbonation reaction tank may be manufactured with a stainless steel material coated with TEFLON (tetrafluoroethylene) or urethane.

A vacuum pump may be further included to form a vacuum by removing air from the carbonation reaction tank before injecting the carbonate gas into the carbonation reaction tank.

The alkali solution input unit may include: a pH measuring unit measuring pH in the carbonation reaction tank; an alkali solution input pump sending an alkali solution into the carbonation reaction tank according to the measured pH; and an alkali solution input nozzle connected to the alkali solution input pump and inputting the alkali solution into the carbonation reaction tank.

The outlet unit ejecting the slurry from the carbonation reaction tank by receiving the signal generated from the level measurement unit may be a rotary dump valve disposed in the carbonation reaction tank.

According to another embodiment of the present invention, a method of carbonation is provided to carbonate cations in brine using brine as a carbonation subject solution for a carbonation device.

The cations in brine may be calcium ions.

The cations in brine may be magnesium ions.

The cations in brine may be lithium ions.

According to another embodiment of the present invention, a method of carbonation is provided that includes: providing a plurality of carbonation devices and providing a first carbonation device and a second carbonation device among them; carbonating calcium in brine using the first carbonation device; and carbonating magnesium in brine, remaining after carbonating calcium using the first carbonation device, using the second carbonation device.

Advantageous Effects

The carbonation device according to one embodiment may prevent the clogging of a carbonation gas spray nozzle during a carbonation reaction and suppress excessive consumption of carbonation gas by consuming as much carbonation gas as required for the carbonation reaction.

In addition, the carbonation efficiency may be enhanced by accomplishing a continuous process at a large capacity and increasing a dissolution speed of carbonation gas.

For example, when recovering lithium (Li) included in brine, calcium, magnesium, or the like present as impurities in brine may be carbonated and extracted. The carbonation device according to one embodiment may be applied even when lithium recovered as lithium hydroxide is converted to lithium carbonate.

DESCRIPTION OF DRAWINGS

FIG. 1 is a schematic diagram showing the entire structure of a carbonation device according to one embodiment.
<DESCRIPTION OF SYMBOLS>
1: storage tank
2: carbonation reaction tank
3: droplet spray unit
4: high-pressure pump
5: droplet spray nozzle
6: carbonation gas storage tank
7: carbonation gas supply unit
8: pressure measuring unit
9: carbonation gas supply valve
10: pressure control valve
11: safety valve
12: pH measuring unit
13: alkali solution input pump
14: alkali solution input nozzle
15: slurry agitation unit
16: level measurement unit
17: rotary dump valve
18: vacuum valve

MODE FOR INVENTION

CROSS-REFERENCE TO RELATED APPLICATION

This application claims priority to and the benefit of Korean Patent Application No. 10-2012-0002181 filed in the Korean Intellectual Property Office on Jan. 6, 2012, the entire contents of which are incorporated herein by reference.

Exemplary embodiments of the present invention will hereinafter be described in detail. However, these embodiments are only exemplary, and the present invention is not limited thereto.

One embodiment of the present invention may provide a carbonation device including: a storage tank storing a carbonation subject solution; a droplet spray unit droplet-spraying the carbonation subject solution from the storage tank; a carbonation reaction tank deposited with the droplet spray unit and filled with carbonation gas having a predetermined pressure to provide a slurry by a carbonation reaction of the droplet-sprayed carbonation subject solution with the filled carbonation gas; a carbonation gas supply unit supplying the carbonation gas inside the carbonation reaction tank to maintain the carbonation gas under constant pressure in the carbonation reaction tank; and a slurry outlet unit ejecting slurry formed in the carbonation reaction tank from the carbonation reaction tank to maintain a slurry amount within a predetermined level.

Examples of the carbonation gas may be a carbon dioxide source or carbon dioxide itself.

FIG. 1 is a schematic diagram showing the overall structure of a carbonation device according to one embodiment.

Hereinafter, it will be described referring to FIG. 1.

The carbonation device according to one embodiment may include a storage tank 1 storing and supplying a carbonation subject solution, and the storage tank 1 may be connected with a droplet spray unit 3 mounted in a carbonation reaction tank 2 through a solution transporting pipe.

The droplet spray unit 3 may include a high-pressure pump 4 and a droplet spray nozzle 5, and for example, the under part of the droplet spray nozzle 5 may protrude into the upper part of the carbonation reaction tank 2 and mounted thereto.

In this case, multiple droplet spray nozzles 5 may be provided according to the capacity. When multiple droplet spray nozzles 5 are provided, the droplet spray angle may be adjusted to prevent interference between droplets sprayed from different droplet spray nozzles 5, and contact of droplets with the wall surface of tank may be minimized to enhance efficiency of the carbonation reaction.

In addition, the droplet spray unit 3 may change the diameter of droplets from about 80 to about 200 μm by adjusting the pressure of the high-pressure pump 4 and the nozzle diameter of the droplet spray nozzles 5. Through changing the particle diameter, the carbonation reaction may be controlled.

A carbonation gas supply unit 7 may be provided in the carbonation reaction tank 2. As an example, the carbonation gas supply unit 7 may be disposed on the carbonation reaction tank 2.

The carbonation gas supply unit 7 may include a pressure measuring unit 8 for measuring a carbonation gas pressure in the carbonation reaction tank 2, a carbonation gas supply valve 9, and a pressure control valve 10 for exhausting excessive pressure to control pressure in the tank.

The pressure measuring unit 8 is a device for measuring the carbonation gas pressure in the tank and controlling the carbonation gas supply valve 9 and the pressure control valve 10, and it may minimize interference due to the sprayed droplet pressure by disposing a pressure measuring sensor in the center part of the carbonation reaction tank 2 away from the droplet spray nozzle 5.

The carbonation gas supply valve 9 is a device for automatically supplying the carbonation gas into the carbonation reaction tank 2 from a carbonation gas storage tank 6 with as much as a predetermined pressure. When pressure is decreased by consuming the carbonation gas in the carbonation reaction tank 2 due to the carbonation reaction, the carbonation gas is automatically supplied by as much as the consumed carbonation gas by receiving a signal from the pressure measuring unit 8.

The carbonation gas supply valve 9 may be set by changing the carbonation gas pressure in the carbonation reaction tank 2 from the room pressure to about 10 bar, from the room pressure to about 8 bar, from the room pressure to about 5 bar, or from the room pressure to about 3 bar.

The pressure control valve 10 is automatically driven by receiving the signal from the pressure measuring unit 8 to control the pressure in the carbonation reaction tank 2 by exhausting excessive pressure when the pressure is over the predetermined carbonation gas pressure.

In addition, a safety valve 11 may be further included to rapidly eliminate excessive pressure in the tank in an emergency.

The safety valve 11 is automatically driven for safety when applying an extraordinarily high pressure in the carbonation reaction tank 2 due to an operation error of the carbonation device to rapidly exhaust the pressure in the carbonation reaction tank 2, and the operation pressure may be arbitrarily set.

The carbonation reaction tank 2 may be designed to, be safely driven under a pressure of greater than or equal to about 10 bar.

In addition, droplets may free-fall in the carbonation reaction tank 2. In this case, the carbonation device may be designated for the droplets to free-fall for greater than or equal to about 3 meters.

In addition, in order to minimize the contact of droplets with the wall surface of the carbonation reaction tank 2 during the free-fall, the diameter thereof may be set to be greater than or equal to about 1 meter.

In addition, the carbonation reaction tank 2 may be made of PVC, PE, or high-strength concrete to prevent corrosion due to brine or the like.

When using a metal, the surface contacting brine may be made of a corrosion-resistant material such as stainless steel coated with TEFLON (tetrafluoroethylene), urethane, or the like.

An alkali solution input unit may include a pH measuring unit 12 measuring pH in the carbonation reaction tank, an alkali solution input pump 13 supplying an alkali solution to the carbonation reaction tank according to the measured pH by the pH measuring unit, and an alkali solution input nozzle 14 connected to the alkali solution input pump and inputting the alkali solution into the carbonation reaction tank.

For example, the alkali solution may be a NaOH solution.

The pH measuring unit 12 may automatically measure pH of the reaction slurry and may operate the alkali solution input pump 13 according to the measured signal.

Thereby, the alkali solution may be input to the reaction slurry through the alkali solution input nozzle 14 such that the object pH is adjusted.

Then the slurry may be agitated using a slurry agitation unit 15 in order to rapidly perform the reaction of the input alkali solution.

In addition, the carbonation reaction tank 2 may include a level measurement unit 16 for ejecting a reaction slurry and an outlet unit ejecting the slurry from the inside of the carbonation reaction tank.

The outlet device ejecting from the inside carbonation reaction tank may include a rotary dump valve 17.

The level measurement unit 16 may automatically measure the slurry level in the carbonation reaction tank 2 when completing the carbonation reaction, and the rotary dump valve 17 may be automatically driven using the signal.

The rotary dump valve 17 is a device for continuously and automatically ejecting the slurry from the carbonation reaction tank 2 according to the slurry level information received from the level measurement unit 16 in order to maintain a predetermined slurry level.

The rotary dump valve 17 may be designed to be operated while maintaining air-tightness in order to minimize pressure change in the carbonation reaction tank 2.

The slurry agitation unit 15 has a function to prevent interference with the operation of the rotary dump valve 17 caused by precipitation of the deposited carbonate and piling up the same in the carbonation reaction tank 2.

A vacuum valve 18 may be disposed on the carbonation reaction tank 2 and may be connected to a vacuum pump.

Hereinafter, the operation relationship of the carbonation device having the structure is described with one example.

First, the vacuum valve 18 is opened, and the vacuum pump is driven to remove all air from the carbonation reaction tank 2.

When the air is sufficiently removed from the carbonation reaction tank 2, the vacuum valve is closed, and the carbonation gas supply valve 9 is opened to supply a carbonation gas into the carbonation reaction tank.

When the carbonation gas pressure reaches a predetermined level in the carbonation reaction tank 2, the carbonation gas supply valve 9 is closed, and the droplet spray unit 3 is operated to spray droplets having a predetermined particle diameter into the tank through the droplet spray nozzle 5.

For example, the sprayed droplets free-fall by gravity in the carbonation reaction tank 2, and during that time, the carbonation gas excessively filled in the tank is dissolved in the droplets to be converted to carbonate ions ($CO_3^{2-}$), and the carbonate ions ($CO_3^{2-}$) react with the carbonation subject cations in the droplets to deposit a carbonate.

In this case, in order to optimize and enhance the efficiency of carbonation reaction, the contact specific surface area with the carbonation gas may be controlled by adjusting the particle diameter of the droplets, the reaction time may be controlled by adjusting the falling speed of the droplets, and the carbonation gas dissolution speed may be controlled by adjusting the pressure of the carbonation gas.

When the carbonation reaction occurs, the carbonation gas filled in the carbonation reaction tank 2 is consumed to decrease the pressure in the tank.

When the carbonation gas pressure is decreased, the pressure measuring unit 8 senses this to operate the carbonation gas supply valve 9 and the pressure control valve 10, so the carbonation gas pressure in the carbonation reaction tank 2 is automatically controlled to the predetermined level.

On the other hand, when the solution dissolved with many carbonation subject cations is carbonated, the amount of carbonation gas to be dissolved in the solution is increased, but the pH of the solution may be reduced to less than or equal to about 4 when too great an amount of carbonation gas is dissolved.

In this case, the dissolved carbonation gas may be present in a form of bicarbonate ions ($HCO_3^{1-}$), and the compound of cations bound with bicarbonate ions is little deposited since the solubility thereof is generally high.

When the solution is ejected as it is to the outside which is under room pressure, the carbonation gas that is supersaturated by the pressure is rapidly exhausted to remarkably decrease the carbonation efficiency.

Accordingly, pH of the solution dissolved with the carbonation gas is increased in the carbonation reaction tank to convert bicarbonate ions ($HCO_3^{1-}$) to carbonate ions ($CO_3^{2-}$) and to complete the carbonation reaction, so that a carbonate may be deposited.

For this purpose, the pH of the solution is measured in the carbonation reaction tank 2 using the pH measuring unit 12 to operate the alkali solution input pump 13 using the signal.

The alkali solution input pump 13 may input an alkali solution into the lower part of the solution in the carbonation reaction tank 2 through the alkali solution input nozzle 14 until the solution is adjusted to the predetermined pH.

The slurry agitation unit 15 may then agitate to rapidly mix the alkali solution with the slurry.

On the other hand, the level of slurry in which the carbonation reaction is completed in the carbonation reaction tank 2 is increased, and when the level reaches the predetermined level, the level measurement unit 16 senses the same to automatically operate the rotary dump valve 17 so that the slurry is continuously ejected to the outside of the carbonation reaction tank 2.

In this case, the slurry agitation unit 15 may also prevent carbonate precipitate in the slurry from settling and being deposited in the lower part of the tank.

According to another embodiment, a method of carbonation in which cations in brine that is carbonated using the brine as a carbonation subject solution for the carbonation device is provided.

The carbonation subject solution may be brine. In other words, cations in brine may be carbonated using the carbonation device.

Examples of the cations in brine may include magnesium ions, calcium ions, lithium ions, and the like.

The certain cations in brine may be selectively carbonated using the alkali solution input unit.

The kind of carbonate settled in the slurry may be selectively controlled by adjusting pH of the slurry. Thereby, the certain cations in brine may be selectively separated.

In other words, in order to recover lithium (Li) included in brine using the carbonation device, magnesium ions, calcium ions, or the like which are impurities present in the brine may be extracted.

In addition, even when lithium recovered as lithium hydroxide is converted to lithium carbonate, the carbonation device may be applied.

According to another embodiment, a method of carbonation is provided that includes providing a first carbonation device and a second carbonation device according to one embodiment, carbonating calcium in brine using the first carbonation device, and carbonating magnesium remaining in the brine using the second carbonation device after carbonating calcium in the brine using the first carbonation device.

In other words, multiple carbonation devices may be provided, and the multiple carbonation devices may be provided so that a filtrate in the slurry that is ejected by one carbonation device is supplied to a droplet spray device of another carbonation device.

For example, when the carbonation subject solution is a brine, the calcium ions are carbonated and precipitated in the first carbonation device, and then the filtrate thereof may be input into the second carbonation device to precipitate carbonate magnesium ions.

Thereby, the various cations in brine may be separated to be used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A carbonation device comprising:
    a storage tank configured to store a carbonation subject solution, wherein the carbonation subject solution is lithium hydroxide;
    a droplet spray unit configured to spray the lithium hydroxide from the storage tank in droplets, wherein the droplet spray unit includes a high-pressure pump and a droplet spray nozzle, the high-pressure pump being coupled to the storage tank, and wherein the droplet spray unit is configured to change a particle diameter of the droplets by adjusting a pressure of the high-pressure pump and a nozzle diameter of the droplet spray nozzle;
    a carbonation reaction tank coupled with the droplet spray unit to receive the droplet-sprayed lithium hydroxide through the droplet spray nozzle that is mounted to an upper part of the carbonation reaction tank, wherein the carbonation reaction tank is filled with a carbonation gas under a predetermined pressure to provide a slurry by a carbonation reaction of the droplet-sprayed lithium hydroxide with the filled carbonation gas;
    a carbonation gas supply unit configured to supply the carbonation gas into the carbonation reaction tank to maintain the carbonation gas in the carbonation reaction tank under the predetermined pressure;
    a slurry outlet unit configured to eject the slurry from the carbonation reaction tank to maintain the slurry formed in the carbonation reaction tank within a predetermined level; and
    an alkali solution input unit disposed in the carbonation reaction tank to adjust a pH of the slurry formed in the carbonation reaction tank,
    wherein the alkali solution input unit comprises:
    a pH measuring unit configured to automatically measure the pH of the slurry in the carbonation reaction tank;
    an alkali solution input pump configured to supply an alkali solution to the carbonation reaction tank according to the pH measured by the pH measuring unit; and
    an alkali solution input nozzle connected to the alkali solution input pump and configured to input the alkali solution into the carbonation reaction tank.

2. The carbonation device of claim 1, further comprising:
    a level measurement unit configured to generate a signal to determine whether an amount of slurry formed in the carbonation reaction tank is out of the predetermined level;
    wherein the slurry outlet unit is configured to eject the slurry from the carbonation reaction tank based on the generated signal.

3. The carbonation device of claim 1, wherein the droplet spray unit is configured to push the lithium hydroxide through the droplet spray nozzle to provide the droplets.

4. The carbonation device of claim 1, wherein the droplet spray unit is configured to change the particle diameter of the droplets from about 80 to about 200 μm.

5. The carbonation device of claim 1, wherein the carbonation gas supply unit comprises:
    a pressure measuring unit configured to measure a pressure in the carbonation reaction tank;
    a carbonation gas supply valve configured to supply the carbonation gas into the carbonation reaction tank to reach the predetermined pressure in the carbonation reaction tank; and
    a pressure control valve configured to exhaust the carbonation gas in the carbonation reaction tank when the measured pressure is higher than the predetermined pressure.

6. The carbonation device of claim 1, further comprising a safety valve configured to rapidly lower an internal pressure of the carbonation reaction tank when the internal pressure of the carbonation reaction tank is excessively high.

7. The carbonation device of claim 1, wherein the carbonation gas supply unit is configured to maintain a pressure in the carbonation reaction tank ranging from a room pressure to about 10 bar.

8. The carbonation device of claim 1, wherein the droplet spray unit is configured to spray the lithium hydroxide in droplets that free-fall in the carbonation reaction tank for a distance of greater than or equal to about 3 meters.

9. The carbonation device of claim 1, wherein the carbonation reaction tank is made of PVC, PE, or high-strength concrete.

10. The carbonation device of claim 1, wherein the carbonation reaction tank is made of a stainless steel material coated with TEFLON (tetrafluoroethylene) or urethane.

11. The carbonation device of claim 1, further comprising a vacuum pump configured to remove air from the carbonation reaction tank to provide a vacuum state in the carbonation reaction tank before inputting the carbonation gas into the carbonation reaction tank.

12. The carbonation device of claim 1, wherein the slurry outlet unit includes a rotary dump valve disposed in the carbonation reaction tank.

\* \* \* \* \*